Figures 3, 3A:
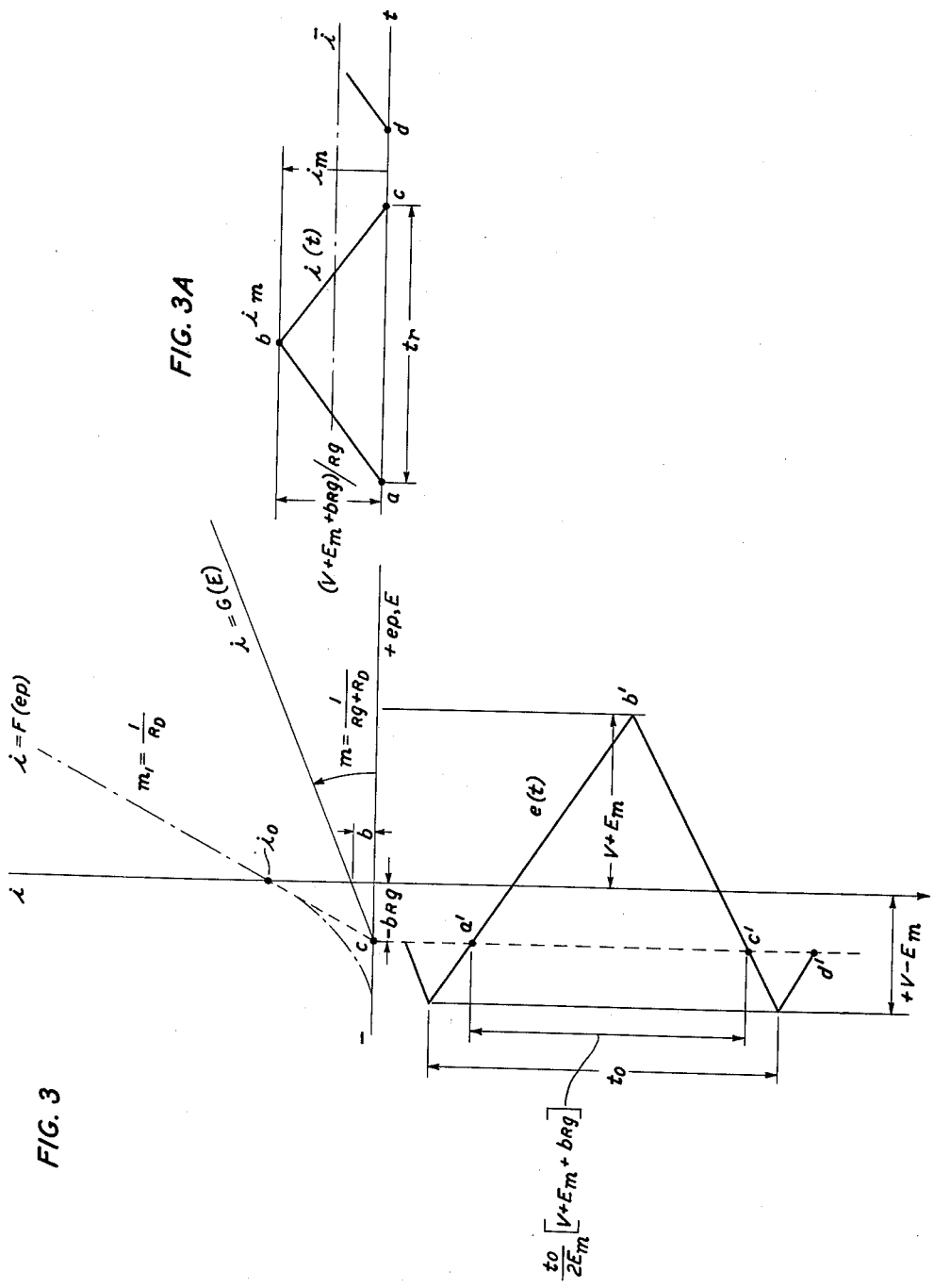

April 6, 1954
E. LAKATOS
2,674,409
ELECTRICAL GENERATOR OF PRODUCTS AND FUNCTIONS
Filed July 12, 1950
6 Sheets-Sheet 1
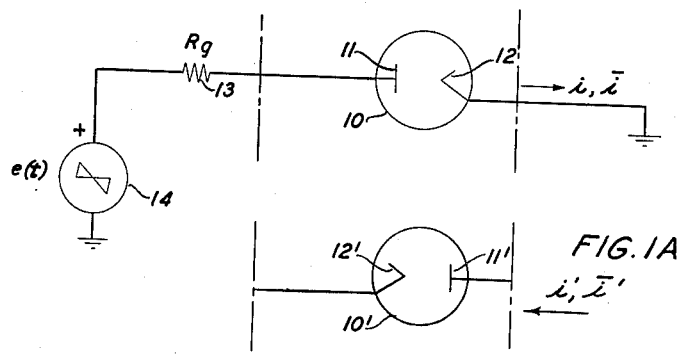
FIG. 1
FIG. 1A
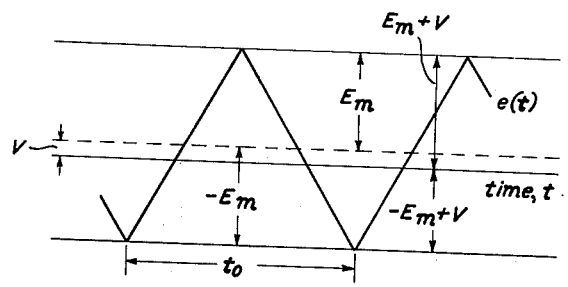
FIG. 2
INVENTOR
E. LAKATOS
BY
*W. P. Dawson*
ATTORNEY April 6, 1954        E. LAKATOS        2,674,409
ELECTRICAL GENERATOR OF PRODUCTS AND FUNCTIONS
Filed July 12, 1950        6 Sheets-Sheet 2

INVENTOR
E. LAKATOS
BY
ATTORNEY

April 6, 1954     E. LAKATOS     2,674,409
ELECTRICAL GENERATOR OF PRODUCTS AND FUNCTIONS
Filed July 12, 1950     6 Sheets-Sheet 3

INVENTOR
E. LAKATOS
BY
ATTORNEY

April 6, 1954     E. LAKATOS     2,674,409
ELECTRICAL GENERATOR OF PRODUCTS AND FUNCTIONS
Filed July 12, 1950     6 Sheets-Sheet 4

INVENTOR
E. LAKATOS
BY
    ATTORNEY

April 6, 1954   E. LAKATOS   2,674,409
ELECTRICAL GENERATOR OF PRODUCTS AND FUNCTIONS
Filed July 12, 1950   6 Sheets-Sheet 5

INVENTOR
E. LAKATOS
BY
*W.R.Dawson*
ATTORNEY

INVENTOR
E. LAKATOS
BY
W.K. Dawson
ATTORNEY

Patented Apr. 6, 1954

2,674,409

UNITED STATES PATENT OFFICE 2,674,409

ELECTRICAL GENERATOR OF PRODUCTS AND FUNCTIONS

Emory Lakatos, Cranford, N. J., assignor to Bell Telephone Laboratories, Incorporated, New York, N. Y., a corporation of New York Application July 12, 1950, Serial No. 173,271

16 Claims. (Cl. 235—61)

This invention relates to electrical computing networks producing quantities of electrical energy representing functions of a single mathematical quantity, or of a plurality of mathematical quantities.

The object of the invention is an electrical network producing various quantities of electrical energy which, when algebraically added, will produce a quantity of electrical energy representing a function of a single mathematical quantity, or a function of a plurality of mathematical quantities.

A feature of the invention is the use of a plurality of triangular waves producing electrical currents which are respectively biased by other electrical currents representing functions of one or more mathematical quantities, then rectified, and the products of the various rectifications algebraically added to produce a quantity of electrical energy representing a function of one, or more, of the mathematical quantities. Specifically, the sum of the products of the various rectifications may represent the square, or square root, of one mathematical quantity; or the product, or quotient, of two mathematical quantities. The source of the triangular wave may be connected in series respectively with the biasing sources and these combinations respectively connected through resistors to the rectifiers; or preferably, the source of the triangular wave, and the biasing sources, may be connected through individual resistors to the rectifiers.

In its broadest aspect, the present invention is based upon the novel principle that, if a steady-state triangular wave is biased with a biasing voltage, and the resultant wave is rectified, the rectified output includes a current which is a linear function of the square of the bias voltage. If the rectifier is associated with a reverse feedback amplifier, the output of the amplifier will be a function of the square root of the bias voltage. Also, if there are two triangular waves, one biased with the sum, and the other with the difference, of two bias voltages, and the resultant waves are rectified, the rectified outputs include currents which are linear functions of the product of the bias voltages. If these rectifiers are associated with a reverse feedback amplifier, the output of the amplifier will be a function of the quotient of the bias voltages.

Figure 5:
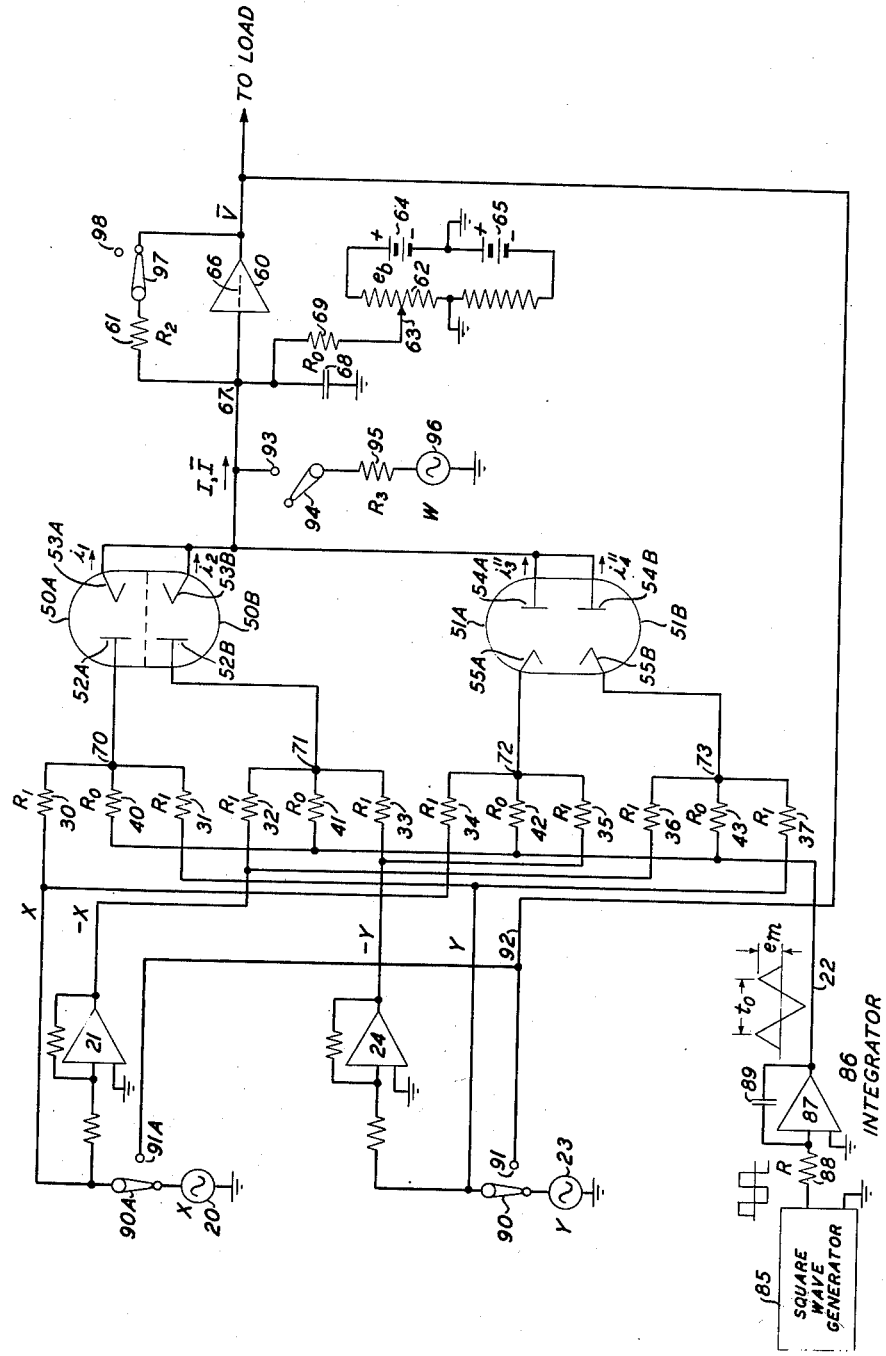
Figure 6:
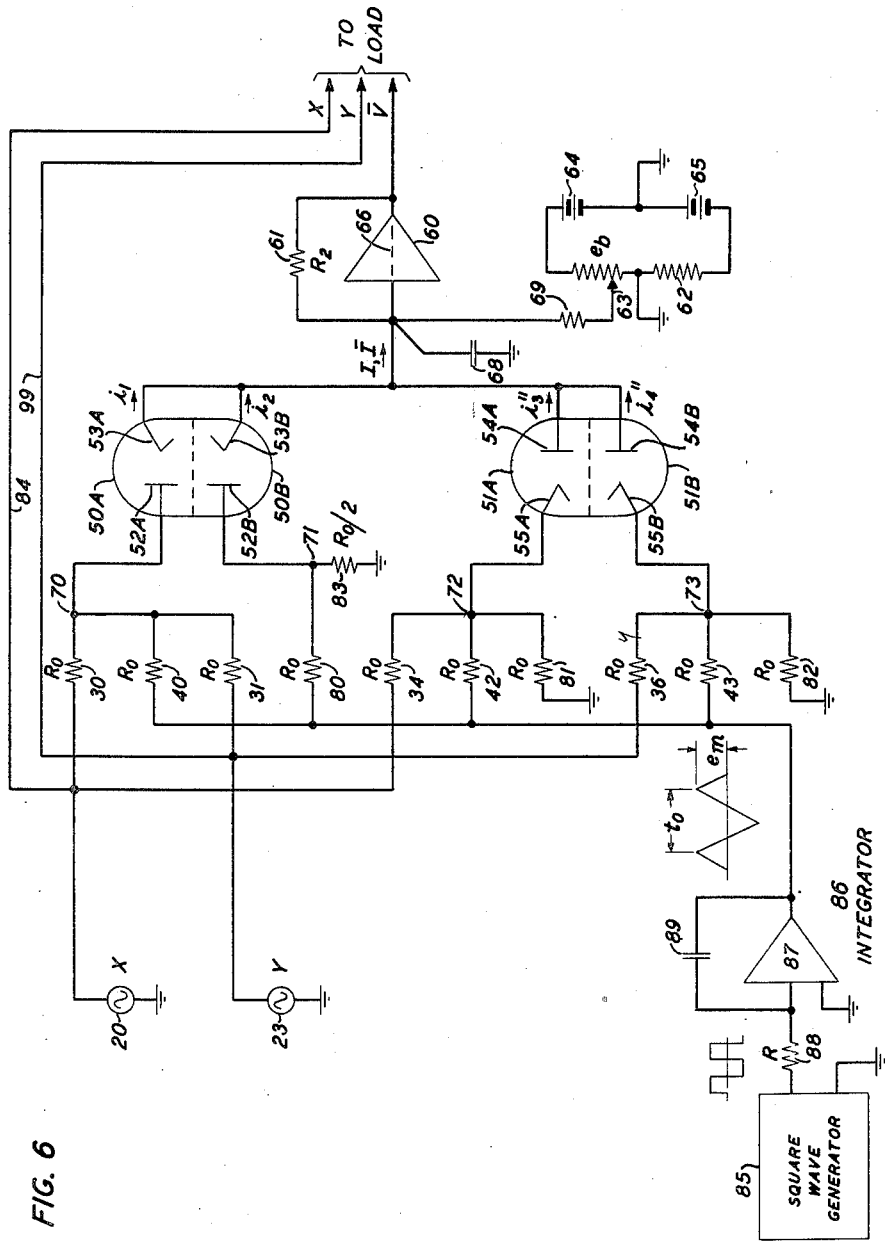
Figure 7:
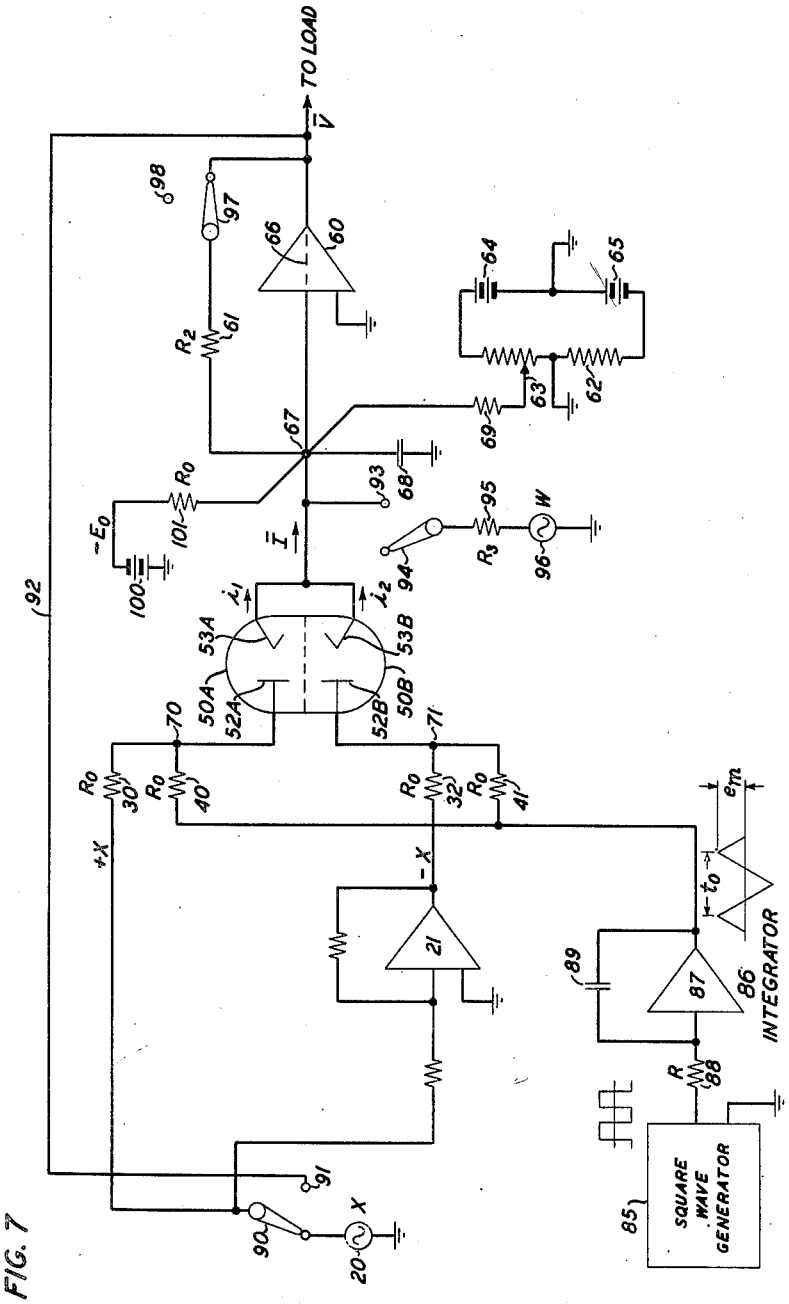

The invention will be more easily understood from the following description of some typical embodiments of the invention; and from the drawings, in which:

Figs. 1 and 1A schematically show simple networks embodying the invention;

Fig. 2 graphically shows the wave shape of the generator in Fig. 1;

Figs. 3, 3A, 4, 4A graphically show the voltage and current wave shapes with a diode rectifier;

Fig. 5 schematically shows a network producing a quantity of electrical energy representing the product or quotient of two factors;

Fig. 6 schematically shows a simplified network producing a quantity of electrical energy representing the product of two factors; and Fig. 7 schematically shows a network producing a quantity of electrical energy representing the square, or square root, of a mathematical quantity.

Fig. 1 shows schematically a rectifier 10, having a plate 11 and a cathode 12, the latter being shown grounded for illustrative purposes. The rectifier 10 is driven by a generator 14 through an external resistance $R_g$. The generator delivers a voltage $e(t)$ whose wave shape is shown in Fig. 2. This wave has two principal components. One is a repeated triangular wave of period $t_0$ and half amplitude $E_m$ volts, and the other is a bias voltage V. Although V is shown as a constant voltage, it may be allowed to vary with time, provided that its variation is slow relative to one period of the triangular wave. Assuming that this condition is satisfied, the wave $e(t)$ will have a maximum amplitude $$E_m + V$$

in the positive direction and $-E_m + V$ in the negative direction. We shall be interested in calculating the current $i(t)$ that flows in response to $e(t)$ and more particularly, its average value $\bar{i}$.

To do this, in Fig. 3, consider the dashed curve labeled $i = F(e_p)$. This shows the forward current through an electronic rectifier as a function of $e_p$, the voltage applied to the rectifier. For positive values of $e_p$, the current voltage relationship in some rectifiers may be slightly curved, and in other rectifiers this relationship may be substantially linear, but, for simplicity of discussion, the relationship may be idealized as substantially linear, the slope $m_1$ of the curve being the reciprocal of the average resistance of the rectifier, $R_D$, in the forward direction. This average resistance usually is low, not exceeding a few hundred ohms. This curve may arise at the origin, but, in the case of electronic diodes, the origin of the curve is usually not at the origin. For small voltages, which may be negative, the relationship between current and voltage is curvilinear, and eventually, for some voltage, the current is substantially zero. The effective cut-off point C may be defined as the point where the idealized straight line portion of the characteristic, when extended, cuts the voltage axis.

If a resistance $R_g$ is inserted in series with the diode and if $R_g$ is very large compared to the forward resistance of the diode, the over-all current-voltage relation $i=G(E)$ will be approximated very closely by a straight line which starts at the effective cut-off point C and has a slope $$m=1/(R_D+R_g)$$

Since for practical applications $R_g$ may be taken at least 100 times $R_D$, the slope may be taken to be $m=1/R_g$. We note for future reference that if the diode has an intercept $i_0$ amperes on the current axis, the over-all characteristic has, on the same axis, an intercept $$b=\frac{i_0 R_D}{R_D+R_g} \doteq \frac{i_0 R_D}{R_g}$$

and on the voltage axis an intercept $-bR_g$ or $-i_0 R_D$.

Suppose now that the voltage E applied is specifically that shown in Fig. 2, namely $e(t)$. A plot of this voltage against time is that labeled $a'b'c'd'$ in Fig. 3. The resulting current flow has the wave shape $i(t)$, labeled $abcd$ in Fig. 3A, provided that $$|V| \leq |E_m|$$

There will be current flow for a time interval $t_r$ during each cycle. The amplitude of the triangular wave, that is, the height of the triangle from the base $t_0$ to $b'$ is $2E_m$. The height of the triangle $a'b'c'$ is $(V+E_m+bR_g)$. The length of line $a'c'$ is $$t_0 \frac{(V+E_m+bR_g)}{2E_m}$$

The length of this interval is the same as that from $a'$ to $c'$ and has the value $$t_r = t_0(E_m+V+bR_g)/2E_m \quad -E_m \leq V \leq E_m \quad (1)$$

The maximum current is $i_m$ and its value is very nearly $$i_m = (E_m+V+bR_g)/R_g \quad (2)$$

The mean current $\bar{i}$ is obtained by averaging the current $i(t)$ over one cycle. As the current $i(t)$ has a triangular variation, the average current during the time interval $t_0$ will be the area of the triangle, $$\frac{1}{2} i_m t_r$$

divided by the interval $t_0$, that is, $$\bar{i}=\frac{1}{2} \frac{i_m t_r}{t_0} \quad (3)$$

Substituting (1) and (2) into (3), we get $$\bar{i}=(E_m+V+bR_g)^2/4E_m R_g \quad (4)$$

A second case that has to be considered is the one where the plate and cathode connections are reversed with respect to generator and ground. This is shown in Fig. 1A by the rectifier $10'$, its plate $11'$ and cathode $12'$. The instantaneous an average currents will be denoted by $i'$ and $\bar{i}'$ respectively. Since conduction is from plate to cathode, it will be seen for this case that the flow of $i'$ is in the opposite sense to the flow of $i$. Since the plate is maintained at ground potential, the cathode need not get more positive than, say, $+1$ volt to have conduction. The plot of $i'$ against the cathode voltage is therefore of the form shown in Fig. 4A. It will be seen that the complete current-voltage relation $i'=G(E)$ is merely the mirror image of the one shown in Fig. 3. If the applied voltage, $a'b'c'd'$, has a maximum positive amplitude of $E_m+V$ and a maximum negative amplitude $-E_m+V$ (with $-E_m \leq V \leq E_m$), the resulting current wave $i'(t)$ is that shown by $abcd$ in Fig. 4A. The duration of the wave is $$t_r = t_0(E_m-V-bR_g)/2E_m \quad (5)$$

its maximum current amplitude is $i'_m$ and its value is very nearly $$i'_m = (E_m-V-bR_g)/R_g \quad (6)$$

and the average current is $$\bar{i}' = (E_m-V-bR_g)^2/4E_m R_g \quad (7)$$

In view of the fact already stated that $i$ and $i'$ flow in opposite directions, we may write $i''=-i'$ and then we have $$\bar{i}'' = -(E_m-V-bR_g)^2/4E_m R_g \quad (8)$$

The results contained in Equations 4 and 8 will be needed in the description of the functioning of the present invention.

Fig. 5 is a preferred embodiment of a multiplier. The two variables $x$ and $y$ whose product is desired are represented by proportionate signal voltages 20 and 23, respectively. These voltages may be conveniently thought of as being slowly varying direct-current voltages, but they can also be alternating voltages having a period long compared to the period of the triangular wave. It is to be assumed that the internal impedance of the generators furnishing these voltages is quite small, say a few ohms; and it is, of course, evident that the voltages representing $x$ and $y$ may be obtained, if desired, by suitably fractionalizing the voltage from a common source.

The $x$ voltage 20 is applied to a shunt feedback amplifier 21 of the type disclosed in Patent 2,401,779, issued June 11, 1946 to K. D. Swartzel. The output of this amplifier is a negative copy, $-x$ of its input. Similarly, the $y$ voltage 23 is applied to amplifier 24 whose output is then $-y$ volts. The output impedances of these amplifiers are very low, say, a few ohms.

These voltages $x$, $-x$, $y$ and $-y$ are inputs to the multiplier proper. Another input voltage that is required for the operation of the device is a periodic triangular wave which comes in over lead 22. In slope, it is symmetrical about the time axis and has a half amplitude of $e_m$. Its period is $t_0$. Its rates of rise and fall may be approximately equal. The generation of this triangular wave may be conveniently accomplished through the use of a square wave generator 85 of any conventional type. The output of 85 is fed to the input of integrator 86, which may consist of a high gain amplifier 87 having an input resistance 88 and a feedback capacitor 89, as shown, for example, in British Patents 575,250, February 11, 1946, Cossor Limited and 580,527, September 11, 1946, A. D. Blumlein.

The amplitude of this wave may be made any desirable value, say 100 volts, by proper choice of the amplitude of the square wave and the RC product of the integrator. Making the duration of the positive and negative portions of the square wave approximately equal satisfies the requirement that the rates of rise and fall of the triangular wave are to be approximately equal.

The five voltages, namely, the triangular waves, $\pm x$ and $\pm y$, are applied to the diode pairs 50A, 50B and 51A, 51B through four groups of three resistors in the following manner. The plate 52A of diode 50A is connected at junction 70 to resistors 30, 31 and 40. The plate 52B of diode 50B is connected at junction 71 to resistors 32, 33 and 41. The cathode 55A of diode 51A connects at junction 72 to resistances 34, 35 and 42 while the cathode 55B of diode 51B connects at junction 73 to resistances 36, 37 and 43.

The other end of resistances 40, 41, 42 and 43 are connected to lead 22 coming from the triangular wave generator. The signal voltage $x$ is applied to the resistances 30 and 34. The voltage $-x$ is applied to resistances 32 and 36. The voltage $y$ is applied to resistances 31 and 37 and its negative, $-y$, is applied to resistances 33 and 35.

The resistances 40, 41, 42 and 43 may be taken at any convenient value $R_0$, say 100,000 ohms. They should, however, be as nearly identical in value as is feasible in order to obtain the highest accuracy from the multiplier.

Likewise, the resistances 30 through 37, inclusive, are to be as nearly alike in value as feasible. While not absolutely necessary it is desirable that their nominal value $R_1$ be taken the same as for the resistances 40 through 43, inclusive. In what follows we shall assume that this is done.

The currents from the cathodes 53A, 53B and from the plates 54A, 54B are fed to the junction 67 which connects to the first grid 66 of a high gain, shunt feedback amplifier 60, having a feedback resistance 61 of value $R_2$. This amplifier may be of the type disclosed in United States Patent 2,401,779, issued June 11, 1946, to K. D. Swartzel. It is a property of this amplifier that its effective input impedance is very low, of the order of a few ohms. Hence, in sofar as the flow of the currents $i_1$, $i_2$, $i_3''$ and $i_4''$ is concerned, the junction 67 is essentially at ground potential.

Connected to the junction 67 is a capacitor 68. The function of this capacitor is to perform the time averaging operation on the currents flowing into or out of the junction 67. This implies that the capacitor 68 effectively filters out those components of the current waves, such as $i(t)$ in Figs. 3 and 4 which have periods $t_0$ or less. The frequencies in the signals $x$ and $y$ are not attenuated to any appreciable extent. Consequently $\bar{I}$, the average of the currents flowing into the junction 67 and thence into the grid 66 is the same as the sum of the time averages of the currents $i_1$, $i_2$, $i_3''$ and $i_4''$ actually present. That is $$\bar{I} = \bar{i}_1 + \bar{i}_2 + \bar{i}_3'' + \bar{i}_4'' \quad (9)$$

Also connected to junction 67 is a bias circuit This consists of a center tapped potentiometer 62, energized by batteries 64 and 65, poled as shown. The slider 63 of the potentiometer connects to junction 67 through a resistance 69 of any convenient value, say $R_0$. The current flowing into junction 67 from the slider 63 is $e_b/R_0$, where $e_b$ is the voltage at the slider. The purpose of this bias circuit is to permit the zeroing of the output $\bar{v}$ of amplifier 60, as explained hereinbelow.

The output voltage $\bar{v}$ is related to the time average of all the currents entering the junction 67 by the relation $$\bar{v} = -R_2(\bar{I} + e_b/R_0)$$
$$= -R_2(\bar{i}_1 + \bar{i}_2 + \bar{i}_3'' + \bar{i}_4'' + e_b/R_0) \quad (10)$$

Using Relations 4, 8 and 10, the value of the output voltage $\bar{v}$ may now be calculated in the following manner. By Thévenin's Theorem, the circuit to the left of junction 70 may be replaced by an equivalent generator of resistance $R_0/3$ (if we take $R_1=R_0$), and a biased triangular wave whose positive amplitude is $(e_m+x+y)/3$. The circuit at junction 70 and the diode 50A are fully equivalent to the circuit of Fig. 1 with resistance $R_g$ connected to diode 10. The mean current for this case is given by Equation 4. Hence we identify $E_m$ with $e_m/3$ and $V$ with $(x+y)/3$.

For junction 71 and diode 50B, the conditions are the same except that $V$ is now to be identified with $-(x+y)/3$.

The circuit at junction 72 and diode 51A are fully equivalent to the circuit of Fig. 1 with the resistance $R_g$ connected to diode 10'. The mean current for this case is given by Equation 8. We identify $R_g$ with $R_0/3$, $E_m$ with $e_m/3$ and $V$ with $(x-y)/3$. The conditions at junction 73 are similar except that $V$ is to be identified as $(-x+y)/3$.

Figure 4:
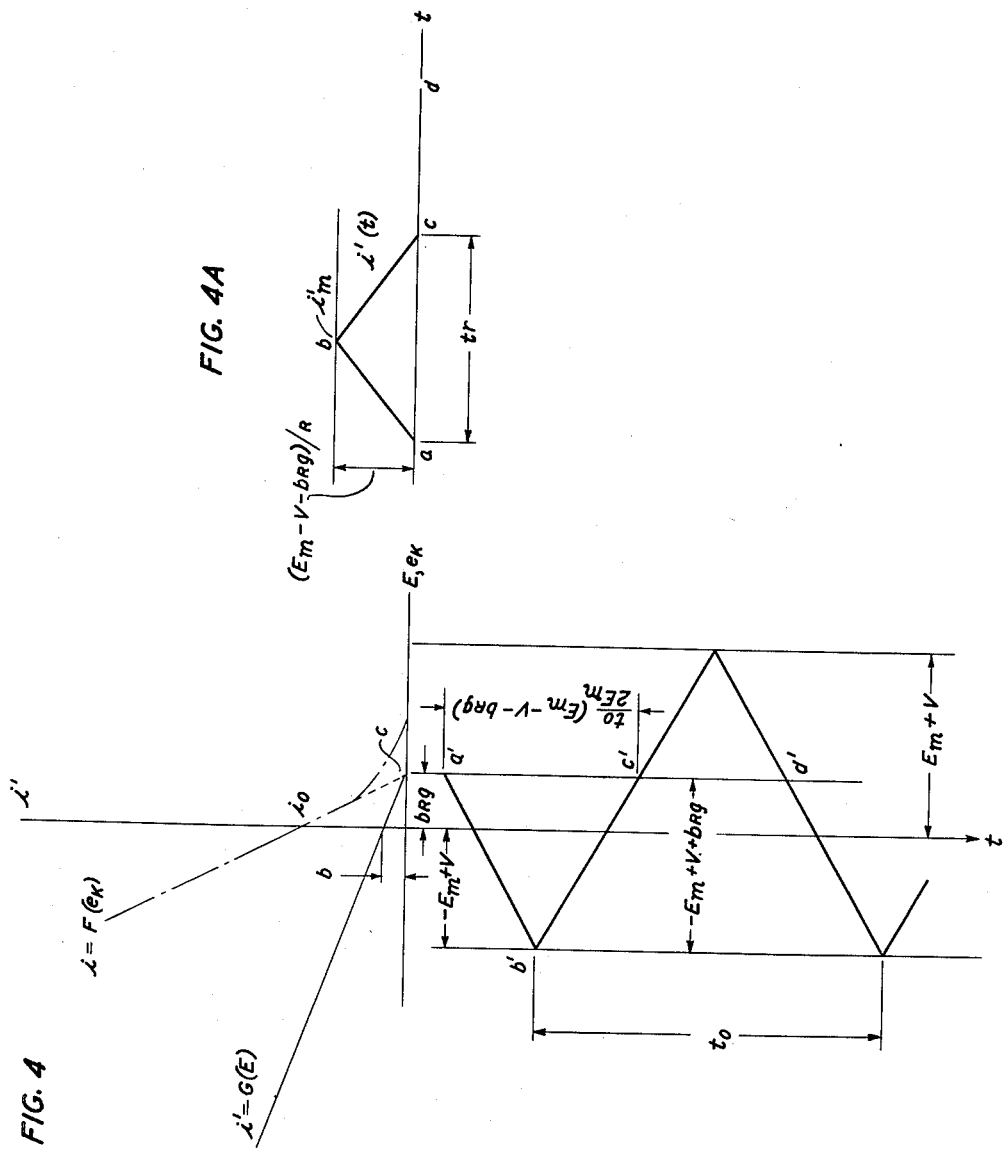

We also note that the intercept $b$ in Figs. 3 and 4 may have different values for each of the diodes. We therefore assume that for diode 50A it is $b_1$, for 50B it is $b_2$, for 51A it is $b_3$, and for 51B it is $b_4$. Then, using the above identifications, substituting the values into Equation 4 or 8 as required, we get $$\bar{i}_1 = \left(\frac{e_m+x+y}{3}+\frac{b_1R_0}{3}\right)^2 \bigg/ 4\frac{e_m}{3}\cdot\frac{R_0}{3} \quad (11)$$

$$\bar{i}_2 = \left(\frac{e_m-x-y}{3}+\frac{b_2R_0}{3}\right)^2 \bigg/ 4\frac{e_m}{3}\cdot\frac{R_0}{3} \quad (12)$$

$$\bar{i}_3'' = -\left(\frac{e_m-x+y}{3}-\frac{b_3R_0}{3}\right)^2 \bigg/ 4\frac{e_m}{3}\cdot\frac{R_0}{3} \quad (13)$$

$$\bar{i}_4'' = -\left(\frac{e_m+x-y}{3}-\frac{b_4R_0}{3}\right)^2 \bigg/ 4\frac{e_m}{3}\cdot\frac{R_0}{3} \quad (14)$$

Substituting these values into (10) and collecting terms, gives $$-\bar{v} = \frac{R_2}{4e_mR_0}(8xy + 2e_mR_0(b_1+b_2+b_3+b_4) +$$
$$2xR_0(b_1-b_2-b_3+b_4) + 2yR_0(b_1-b_2+b_3-b_4) +$$
$$R_0^2(b_1^2+b_2^2-b_3^2-b_4^2)) + \frac{e_bR_2}{R_0}$$
$$(15)$$

It will be observed that the above expression indicates that the output voltage will contain a term proportional to the desired product, namely the $8xy$ term. However, it also contains undesired terms involving the intercepts $b_1$ through $b_4$, which may be minimized by the following method. In the apparatus, set the signal voltages $x$ and $y$ each to zero and then adjust the position of the slider 63 until the output $\bar{v}$ is zero. This is tantamount to choosing $e_b$ such that $$-e_b = (2e_mR_0(b_1+b_2+b_3+b_4) +$$
$$R_0^2(b_1^2+b_2^2-b_3^2-b_4^2))/4e_m$$

Then for non-zero values of signal voltages, Equation 15 reduces to $$\bar{v} = -\frac{R_2}{4e_mR_0}(8xy + 2xR_0(b_1-b_2-b_3+b_4) +$$
$$2yR_0(b_1-b_2+b_3-b_4))$$
$$(16)$$

The error introduced by the still remaining terms can be evaluated as follows. As already stated the current intercepts $b_1$ through $b_4$ are related to the typical current intercepts $i_0$ of the diode characteristic (see Fig. 3) through the approximate relation $$b = i_0 R_D/R_g \quad (17)$$

The intercept $i_0$ varies from tube to tube due to manufacturing variations. This variation may be as large as ±10 per cent. If we take an extreme case such that $b_1=b_4=1.10x$ average value, and $b_2=b_3=0.90x$ average, the error term is $2xR_0$ $(0.4\, i_0R_D/R_g)$. The largest error will occur when $x=e_m/2$, and for a typical diode in which, $R_D=250$ ohms and $i_0$ is $10^{-3}$ amperes, since $R_0=3R_g$, the extreme error is proportional to $1.2\times10^{-3}\times250e_m$. The error relative to the corresponding maximum useful signal, namely $8xy$ (or $2e_m{}^2$) is therefore $0.15/e_m$. As a practical value for $e_m$ is 100 volts, even in the most extreme case, the error referred to the maximum is only 0.15 per cent and on the average it will be much less than this. Furthermore by careful selection and matching of the diodes, the error can be made very nearly zero. Then, for all practical purposes, the relation between the output voltage $\bar{v}$ of amplifier 60 and the input signals $x$ and $y$ may be written as $$\bar{v}=-\frac{2xy}{e_m}\cdot\frac{R_2}{R_0}\text{ volts} \quad (18)$$

As stated before, a practical value of $e_m$ is 100 volts. Recalling that neither $x$ nor $y$ may exceed $e_m/2$, that is, 50 volts in this case, the maximum value of $\bar{v}$ will be 50 volts if we take the feedback resistance $R_2$ (resistance 61) as equal to $R_0$. For other applications, any desired scale factor may be obtained by proper choice of $R_2/R_0$.

While the multiplier has been disclosed as using electron tube diodes, it is evident that each of these may be replaced by any solid rectifier, preferably the high back voltage germanium crystal diode. Since the current voltage characteristic of such crystal passes through the origin, the intercepts $b_1$, $b_2$, $b_3$, $b_4$, are zero, thus the bias potentiometer 62 may be eliminated.

With $b=0$, and $V=(\pm x\pm y)$ Equations 4 and 8 may be respectively written as $$\bar{i}=\frac{1}{4E_mR_g}[E_m{}^2+2E_m(\pm x\pm y)+x^2+y^2\pm 2xy] \quad (4a)$$

$$\overline{i''}=\frac{1}{4E_mR_g}[E_m{}^2-2E_m(\pm x\pm y)+x^2+y^2\pm 2xy] \quad (8a)$$

For convenience, the signs of the terms in the square brackets may be tabulated in terms of the signs of $x$ and $y$.

EQUATION 4a

| $x$ | $y$ | $E_m{}^2$ | $2E_mx$ | $2E_my$ | $x^2$ | $y^2$ | $2xy$ |
|---|---|---|---|---|---|---|---|
| + | + | + | + | + | + | + | + |
| − | + | + | − | + | + | + | − |
| + | − | + | + | − | + | + | − |
| − | − | + | − | − | + | + | + |
| + | 0 | + | + | 0 | + | 0 | 0 |
| − | 0 | + | − | 0 | + | 0 | 0 |
| 0 | + | + | 0 | + | 0 | + | 0 |
| 0 | − | + | 0 | − | 0 | + | 0 |
| 0 | 0 | + | 0 | 0 | 0 | 0 | 0 |

EQUATION 8a

| | | | | | | | |
|---|---|---|---|---|---|---|---|
| + | + | − | − | − | − | − | − |
| − | + | − | + | − | − | − | + |
| + | − | − | − | + | − | − | + |
| − | − | − | + | + | − | − | − |
| + | 0 | − | − | 0 | − | 0 | 0 |
| − | 0 | − | + | 0 | − | 0 | 0 |
| 0 | + | − | 0 | − | 0 | − | 0 |
| 0 | − | − | 0 | + | 0 | − | 0 |
| 0 | 0 | − | 0 | 0 | 0 | 0 | 0 |

The first, fourth, eleventh, and twelfth lines may respectively be identified with Equations 11, 12, 13, 14. Other typical networks, using different combinations of currents, will be described hereinbelow. It is evident that many other networks may be devised within the scope of the invention to produce quantities of electrical energy representing various functions of the quantities $x$ and $y$, involving in each case the use of the auxiliary triangular function $E(t)$. The network to be used in any particular case will usually be determined by engineering considerations, such as the relative simplicity of wiring and minimum use of apparatus.

Fig. 6 shows a form of the multiplier in which the need for supplying negative copies of the $x$ and $y$ signal voltages has been eliminated. This is desirable at times for reasons of circuit economy. In this figure, everything to the right of junctions 70, 71, 72 and 73 is identical with the corresponding elements of Fig. 5. The square wave generator 85 and the integrator 86, are also the same as before. The sources of signal voltages $x$, 20, and $y$, 23, are also unchanged, as are the resistive elements 30, 31, 34, 36, 40, 42 and 43. These will be assumed to be alike in value, of $R_0$ ohms.

The signal $x$ is applied to resistors 30 and 34. The signal $y$ is applied to resistors 31 and 36. The triangular wave is applied to resistors 40, 80, 42 and 43. Resistors 81 and 82, of value $R_0$, are grounded. The value of resistor 80 is also taken as $R_0$, but it is shunted to ground through resistance 83 of value $R_0/2$.

In the interest of simplifying the calculations, it will be assumed here that the current-voltage characteristics in Figs. 3 and 4 of the diodes go through the origin. This is a permissible assumption since it was established in connection with the multiplier of Fig. 5 that if the diodes are reasonably alike in their characteristics the effect of the bias circuit 62, 63 is to cause the effects of the bias $b$ to vanish. That is, we shall take $b_1=b_2=b_3=b_4=0$.

The performance of this structure can be found from Equations 11 through 14. At junction 70, Equation 11 applies unchanged except that $b_1=0$. This gives $$\bar{i}_1=(e_m+x+y)^2/4e_mR_0 \quad (19)$$

At junction 71, Equation 12 applies with $$x=y=b_2=0$$

Then $$\bar{i}_2=e_m{}^2/4e_mR_0 \quad (20)$$

At junction 72, we use Equation 13 with $y=b_3=0$ and at junction 73, Equation 14 applies with $x=b_4=0$. Therefore $$\bar{i}_3''=-(e_m-x)^2/4e_mR_0 \quad (21)$$

$$\bar{i}_4''=-(e_m-y)^2/4e_mR_0 \quad (22)$$

Substituting (19) through (22) into (10), we get for the output of amplifier 60, $$\bar{v}=-\left(\frac{xy}{2e_m}+x+y\right)\frac{R_2}{R_0} \quad (23)$$

If we make $R_2=R_0$, the output voltage $v$ of the amplifier 60 will contain a linear term, $-x-y$. This is generally undesirable. This term may be canceled out at the load by applying to the load signals $x$ and $y$, through leads 84 and 99.

The circuit of Fig. 5 may be used to obtain a voltage whose magnitude is the quotient of the signed magnitudes of two other voltages. The switch 90 is operated to make contact with terminal 91 which connects through lead 92 to the output $v$ of amplifier 60. The switch 97 is operated to position 98 and opens up the feedback resistance 61 of amplifier 60. The switch 94 is operated to make contact with terminal 93 which connects to the junction 67 of amplifier 60. The above operation of switch 94 thus connects a generator 96 whose output is $w$ volts, through the resistance 95 of value $R_3$ ohms into the junction 67. It will be observed that the net effect of operating the switches 90 and 94 is to replace the voltage $y$ by the voltage $\bar{v}$ and to add to the current $\bar{I}$ a component $w/R_3$.

Assuming that the bias circuit 62, 63 has been properly adjusted, so that the quantities $b_1$ through $b_4$ may effectively be considered to have zero values, the average current entering the junction 67 is now $$\bar{I}=\bar{i}_1+\bar{i}_2+\bar{i}_3''+\bar{i}_4''+w/R_3 \qquad (24)$$

The values of the currents $\bar{i}_1, \bar{i}_2, \bar{i}_3''$ and $\bar{i}_4''$ can be found from Equations 11 through 14 if in these equations the biases $b_1 \ldots b_4$ are set equal to zero and $y$ is replaced by $\bar{v}$. Then $$\bar{i}_1=(e_m+x+\bar{v})^2/4e_mR_0$$
$$\bar{i}_2=(e_m-x-\bar{v})^2/4e_mR_0$$
$$\bar{i}_3''=-(e_m-x+\bar{v})^2/4e_mR_0$$
$$\bar{i}_4''=-(e_m+x-\bar{v})^2/4e_mR_0$$

Substituting these values into Equation 24 gives $$\bar{I}=\frac{2x\bar{v}}{e_mR_0}+\frac{w}{R_3} \qquad (25)$$

If the amplifier has an effective input impedance $Z_e$ and a voltage amplification $A$, the output voltage will be $$\bar{v}=-Z_eA\bar{I} \qquad (26)$$

Substituting for $\bar{I}$ from (25) gives $$\bar{v}=-Z_eA\left(\frac{2x\bar{v}}{e_mR_0}+\frac{w}{R_3}\right)$$

or $$\bar{v}=-\frac{w/R_3}{1/Z_eA+2x/e_mR_0}$$

If the product of the amplification $A$ and input impedance $Z_e$ is sufficiently large, then to a high degree of accuracy $$\bar{v}=-\frac{e_mR_0}{2R_3}\cdot\frac{w}{x}$$

We are at liberty to take $R_3$ at any convenient value. If we choose $R_3=R_0/2$, then $$\bar{v}=-e_m\frac{w}{x} \qquad (27)$$

which establishes that the output voltage is proportional to the quotient of the magnitudes of the two input signals, $x$ and $w$.

The currents through the rectifiers $$\bar{i}_1+\bar{i}_2+\bar{i}_3''+\bar{i}_4''$$

add up to a current $$\frac{2x\bar{v}}{e_mR_0}$$

and, as $$\bar{v}=-e_m\frac{w}{x}$$

this current may also be expressed by $$-2\frac{w}{R_0}$$

thus, although the current from the source 96 is actually supplied to the input of amplifier 60, due to the feedback action, a current representing the factor $w$ is actually supplied to the rectifiers 50A, 50B.

Fig. 7 shows a circuit for computing a voltage proportional to the square of the magnitude of another voltage. It is apparent that this function could be accomplished by the circuits of Fig. 5 or 6 by having the two signals $x$ and $y$ equal. However, the circuit of Fig. 7 requires less apparatus.

In this figure, all components labeled with numbers used in Figs. 5 and 6 are identical with the components used in Figs. 5 and 6. The only new circuit element introduced is the battery 100, connected through resistance 101 of value $R_0$ to junction 67. The positive pole of this battery is grounded and it applies $-E_0$ volts to the resistor 101. Consequently it delivers a current $-E_0/R_0$ amperes to the junction 67.

A comparison of Figs. 5 and 7 and an examination of Equations 11 and 12 show that the time average of currents flowing from diodes 50A and 50B into junction 67 are $$\bar{i}_1=\left(\frac{e_m+x}{2}\right)^2\bigg/\frac{4e_m}{2}\cdot\frac{R_0}{2}=(e_m+x)^2/4e_mR_0 \qquad (28)$$

$$\bar{i}_2=(e_m-x)^2/4e_mR_0 \qquad (29)$$

$$-e_m\leq x\leq e_m$$

provided that the biases $b_1$ and $b_2$ are made effectively zero by the process already described. The total averaged current entering the junction 67 is $$\bar{I}=\bar{i}_1+\bar{i}_2-E_0/R_0$$
$$=\frac{e_m^2+x^2}{2e_mR_0}-\frac{E_0}{R_0}$$

If we take $E_0=e_m/2$, the current is $$\bar{I}=x^2/2e_mR_0 \qquad (30)$$

Consequently, the output voltage $\bar{v}$ of amplifier 60 is $$\bar{v}=-\frac{x^2}{2e_m}\cdot\frac{R_2}{R_0} \qquad (31)$$

The circuit of Fig. 7 may be used to generate a voltage whose magnitude is proportional to the square root of the magnitude of a signal voltage $w$. To do this, switches 90, 94 and 97 are operated to positions 91, 93 and 98, respectively. The operation of switch 90 removes the signal $x$ and replaces it by $\bar{v}$ which comes into terminal 91 over lead 92 from amplifier 60. The operation of switch 94 connects in the voltage $w$ and the switching on 97 opens up the feedback resistance 61 of amplifier 60. Consequently, the total current entering the junction is the contribution from $w$ and that given by Equation 30 with $\bar{v}$ replacing $x$. Thus $$\bar{I}=\frac{w}{R_3}+\frac{\bar{v}^2}{2e_mR_0} \qquad (32)$$

If the amplifier 60 has an effective input impedance $Z_e$ and a voltage amplification $A$, the output voltage is $$\bar{v}=-Z_eA\bar{I} \qquad (33)$$

Substituting for $\bar{I}$ from (32) gives $$\bar{v}=-Z_eA\left(\frac{w}{R_3}+\frac{\bar{v}^2}{2e_mR_0}\right)$$

If the product $Z_eA$ is sufficiently large $$\frac{w}{R_3}+\frac{\bar{v}^2}{2e_mR_0}=0$$

or $$\bar{v}=\sqrt{-w\cdot\frac{2e_mR_0}{R_3}} \qquad (33)$$

The currents through the rectifiers $\bar{i}_1$ $\bar{i}_2$ add up to form a current $$\frac{e_m{}^2}{2e_m R_0} + \frac{\bar{v}^2}{2e_m R_0}$$

and, as $$\bar{v}^2 = -w\frac{2e_m R_0}{R_3}$$

this current is equivalent to $$\frac{e_m}{2R_0} - \frac{w}{R_3}$$

thus, although the source 96 is connected to the input circuit of amplifier 60, due to the feedback action, a current representing the factor $w$ is actually supplied to the rectifiers 50A, 50B.

The output $\bar{v}$ will be proportional to the square root of $w$ provided that the latter is represented by a negative voltage. This restriction is brought about by the fact that the output current $\bar{i}_1$, $\bar{i}_2$ are always positive. If the connections to the plates and cathodes of diodes 50A and 50B are interchanged, a similar argument shows that $w$ must now be positive. If $w$ is apt to be of either sign, the circuit of Fig. 5 may be modified by the provision of switch 90A. The operation of this switch to position 91A will apply $\bar{v}$ to amplifier 21 through lead 92A. Then, if $w$ is a negative voltage, current flow is from diodes 50A and 50B. If $w$ is positive, the current flow will be from diodes 51A and 51B.

What is claimed is:

1. An electrical network producing a voltage representing a function of two factors comprising sources of two voltages respectively representing the factors, a generator of a recurrent voltage wave having a triangular variation of amplitude with time, an amplifier having a low impedance input circuit and an output circuit, an integrating device connected across said input circuit, a plurality of two pole asymmetrically conductive devices having one pole connected to said integrating device, a plurality of resistors connecting said generator respectively to the other poles of said asymmetrically conductive devices, and other resistors respectively connected from said sources to the other poles of said devices.

2. An electrical computing network including an amplifier having a low impedance input circuit and an output circuit, a capacitor connected across the input circuit, first and second rectifiers poled in the passing direction connected to said capacitor, third and fourth rectifiers poled in the blocking direction connected to said capacitor, sources of two voltages representing positive and negative values of a factor connected through resistors respectively to said first and third and to said second and fourth rectifiers, other sources of two voltages representing positive and negative values of another factor connected through resistors respectively to said first and fourth and to said second and third rectifiers, and a generator of a recurrent voltage wave having a triangular variation of amplitude with time respectively connected through resistors to all said rectifiers, the maximum amplitude of said wave being not less than the sum of the amplitudes of said factor voltages, whereby the output voltage of said amplifier represents the product of the factors.

3. The combination in claim 2 with switching means for connecting the output circuit of the amplifier in place of one of the sources of factor voltages, and connecting this source through a resistor to the capacitor, whereby the output voltage of the amplifier represents the quotient of the factors.

4. The combination in claim 2 in which the rectifiers are diodes, with a source of current connected to said capacitor and adjusted to neutralize the currents due to curvature of the diode characteristic.

5. An electrical computing network including an amplifier having a low impedance input circuit and an output circuit, a capacitor connected across the input circuit, first and second rectifiers poled in the passing direction connected to said capacitor, third and fourth rectifiers poled in the blocking direction connected to said capacitor, a source of a first voltage representing a first factor, resistors connecting the source of said first voltage to the first and third rectifiers, a source of a second voltage representing a second factor, resistors connecting the source of said second voltage to the first and fourth rectifiers, a generator of a recurrent voltage wave having a triangular variation of amplitude with time, resistors connecting said generator to all said rectifiers, and connections from the sources of said first and second voltages to said output circuit, whereby the output of said amplifier represents the product of said factors.

6. The combination in claim 5 in which the rectifiers are diodes, with a source of current, a potentiometer having a winding connected to said source and a brush connected to said capacitor and adjusted to neutralize the currents due to curvature of the diode characteristics.

7. An electrical computing network including an amplifier having a low impedance input circuit and an output circuit, a capacitor connected across said input circuit, first and second rectifiers poled in the passing direction connected to said capacitor, sources of two voltages representing positive and negative values of a factor respectively connected through resistors to said rectifiers, a generator of a recurrent voltage wave having a triangular variation of amplitude with time, resistors connecting said generators to both said rectifiers, and a source of current connected to said capacitor and adjusted to neutralize the current flowing into said capacitor due to said wave, whereby the output voltage of said amplifier represents the square of said factor.

8. The combination in claim 7 with switching means for connecting the output circuit of said amplifier in place of said source, and for connecting said source through a resistor to the capacitor, whereby the output voltage of the amplifier represents the square root of the factor.

9. The combination in claim 7 in which the rectifiers are diodes, with a source of current connected to the capacitor and adjusted to neutralize the currents due to curvature of the diode characteristic.

10. An electrical network producing a quantity of electrical energy representing a function of two known factors comprising, a grounded generator of a recurrent electrical wave having a variation with time of amplitude with respect to ground approximating to an equilateral triangle, a plurality of two-pole asymmetrically conductive devices, a capacitor connected from one pole of each of said devices to ground, a utilization circuit connected across said capacitor, a plurality of resistors respectively connected from said generator to the other poles of said devices, grounded sources of quantities of electrical energy respectively representing the factors, and other resistors connected from said sources to the other poles of said devices.

11. The combination in claim 10 in which two of the asymmetrically conducting devices are connected to the generator in the passing direction and two of these devices are connected to the generator in the blocking direction, the sources produce quantities of electrical energy respectively representing positive and negative values of both of the factors, and the sources are connected through the other resistors to supply quantities of energy representing positive values of the factors to one of the passing devices, to supply quantities of energy representing negative values of the factors to the other passing device, to supply quantities of energy representing the positive value of one factor and the negative value of the other factor to one of the blocking devices and to supply quantities of energy representing the negative value of the one factor and the positive value of the other factor to the other blocking device.

12. The combination in claim 10 in which two of the asymmetrically conductive devices are connected to the generator in the passing direction and two of these devices are connected to the generator in the blocking direction, the sources produce quantities of electrical energy respectively representing positive values of the factors, the resistors all have the same resistance, both sources are respectively connected through resistors to one of the passing devices, a resistor having half the resistance of the other resistors is connected from the other passing device to ground, the sources are respectively connected through the resistors to the blocking devices, resistors having the same resistance as the plurality of resistors respectively connecting the blocking devices to ground, and connections from the sources directly to the utilization circuit.

13. The combination in claim 10 in which two asymmetrically conductive devices are connected to the generator in the passing direction and the sources supply quantities of electrical energy representing positive and negative values of one factor, a third source of electrical energy, and a resistor connecting said third source to said capacitor to supply a current having an amplitude equal to one-half the maximum amplitude of the wave from the generator.

14. The combination in claim 1 in which two of the asymmetrically conductive devices are connected to the generator in the passing direction and two of these devices are connected to the generator in the blocking direction, means are connected to the sources to produce voltages of opposite polarities representing positive and negative values of the factors, and the other resistors are connected from these means to the devices to supply voltages of one polarity to one of the passing devices, voltages of the other polarity to the other passing device, and voltages of opposite polarities to the blocking devices, whereby the output voltage of the amplifier represents the products of the factors.

15. The combination in claim 14 with an added resistor and switching means for disconnecting one of said sources and connecting this source through said added resistor directly to the integrating device, and for connecting the output of the amplifier in place of this source, whereby the output voltage of the amplifier represents the quotient of the factors.

16. The combination in claim 14 with an added resistor, and switching means for disconnecting both of said sources, for connecting the output of the amplifier in place of both sources, and for connecting the source of one of the factor voltages through the added resistor to the integrating device, whereby the output voltage of the amplifier represents the square root of this factor.

References Cited in the file of this patent

UNITED STATES PATENTS

| Number | Name | Date |
|---|---|---|
| 2,285,038 | Loughlin | June 2, 1942 |
| 2,419,852 | Owen | Apr. 29, 1947 |
| 2,486,068 | Shishini et al. | Oct. 25, 1949 |
| 2,551,740 | Hills | May 8, 1951 |
| 2,568,927 | Morrison | Sept. 25, 1951 |
| 2,580,740 | Dickinson | Jan. 1, 1952 |
| 2,587,193 | Miller | Feb. 26, 1952 |